(12) United States Patent
Kozuma

(10) Patent No.: US 10,500,615 B2
(45) Date of Patent: Dec. 10, 2019

(54) RECORDING APPARATUS AND CLEANING METHOD OF TRANSPORT BELT

(71) Applicant: SEIKO EPSON CORPORATION, Tokyo (JP)

(72) Inventor: Itaru Kozuma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 124 days.

(21) Appl. No.: 15/024,608

(22) PCT Filed: Oct. 1, 2014

(86) PCT No.: PCT/JP2014/005025
§ 371 (c)(1),
(2) Date: Mar. 24, 2016

(87) PCT Pub. No.: WO2015/049868
PCT Pub. Date: Apr. 9, 2015

(65) Prior Publication Data
US 2016/0236246 A1    Aug. 18, 2016

(30) Foreign Application Priority Data

Oct. 4, 2013   (JP) ................. 2013-208809

(51) Int. Cl.
*B08B 7/04*      (2006.01)
*B41J 29/17*     (2006.01)
(Continued)

(52) U.S. Cl.
CPC ............. *B08B 7/04* (2013.01); *B08B 1/006* (2013.01); *B08B 1/02* (2013.01); *B41J 11/007* (2013.01);
(Continued)

(58) Field of Classification Search
CPC ... B08B 1/006; B08B 1/02; B08B 7/04; B41J 11/007; B41J 29/17; B65G 45/18; B65H 2301/531; B65H 5/021
See application file for complete search history.

(56) References Cited

U.S. PATENT DOCUMENTS

| | | | |
|---|---|---|---|
| 5,225,853 A | 7/1993 | Kobayashi et al. | |
| 7,731,348 B2 | 6/2010 | Mitsuhashi et al. | |
| (Continued) | | | |

FOREIGN PATENT DOCUMENTS

| | | |
|---|---|---|
| CN | 101791900 A | 8/2010 |
| CN | 102615991 A | 8/2012 |
| (Continued) | | |

OTHER PUBLICATIONS

Machine translation of JP2004-175497A (Year: 2004).*
European Search Report for Application No. 14851310.4 dated Apr. 13, 2017.

*Primary Examiner* — Douglas Lee
(74) *Attorney, Agent, or Firm* — Workman Nydegger

(57) ABSTRACT

To improve cleaning properties of a transport belt which transports a recording medium. A recording apparatus includes a transport belt (2) which supports and transports a recording medium (P), a recording head (6) through which ink is discharged onto the recording medium (P), and a cleaning portion (10) for the transport belt (2). The recording apparatus has a first cleaning mode in which the cleaning portion (10) cleans the transport belt (2) during transporting of the recording medium (P) by the transport belt (2) and a second cleaning mode in which the cleaning portion (10) cleans the transport belt (2) during a period except for transporting of the recording medium (P) by the transport belt (2).

7 Claims, 4 Drawing Sheets

(51) Int. Cl.
*B08B 1/02* (2006.01)
*B65G 45/18* (2006.01)
*B08B 1/00* (2006.01)
*B41J 11/00* (2006.01)
*B65H 5/02* (2006.01)

(52) U.S. Cl.
CPC ............. *B41J 29/17* (2013.01); *B65G 45/18* (2013.01); *B65H 5/021* (2013.01); *B65H 2301/531* (2013.01)

(56) References Cited

U.S. PATENT DOCUMENTS

| | | | | |
|---|---|---|---|---|
| 2004/0114019 | A1* | 6/2004 | Nakashima | B08B 1/02 347/104 |
| 2005/0168515 | A1* | 8/2005 | Nagai | B41J 3/4078 347/23 |
| 2011/0050801 | A1* | 3/2011 | Uemura | B41J 29/17 347/33 |
| 2012/0194603 | A1* | 8/2012 | Takeda | B41J 11/007 347/22 |

FOREIGN PATENT DOCUMENTS

| | | |
|---|---|---|
| EP | 2 481 696 A2 | 8/2012 |
| JP | 03-227648 A | 10/1991 |
| JP | 2000 131970 A | 5/2000 |
| JP | 2001-122486 A | 5/2001 |
| JP | 2001-315320 A | 11/2001 |
| JP | 2004-050759 A | 2/2004 |
| JP | 2004-175497 A | 6/2004 |
| JP | 2004175497 A * | 6/2004 |
| JP | 2005-280942 A | 10/2005 |
| JP | 2006206279 A | 8/2006 |
| JP | 2007 055001 A | 3/2007 |
| JP | 2007-144713 A | 6/2007 |
| JP | 2007144713 A * | 6/2007 |
| JP | 2012 116093 A | 6/2012 |
| JP | 2012-116617 A | 6/2012 |
| JP | 2012116620 A | 6/2012 |

* cited by examiner

[Fig. 1]
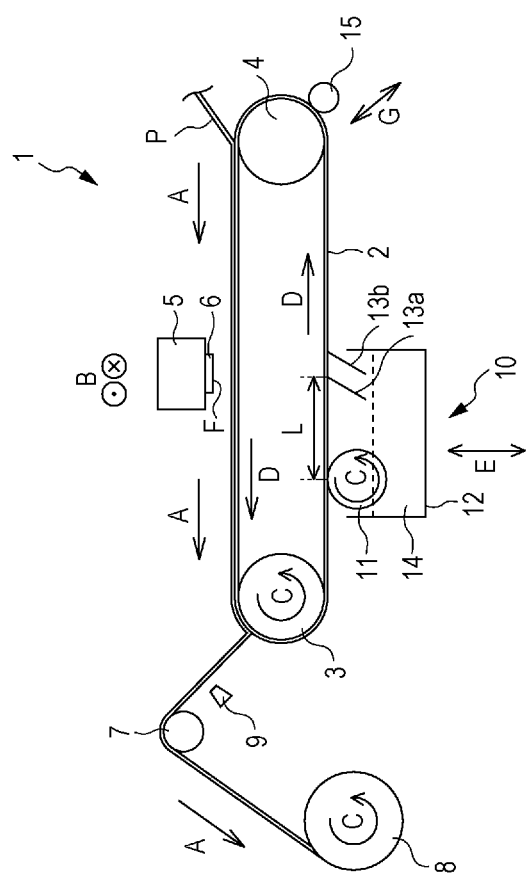

[Fig. 2]
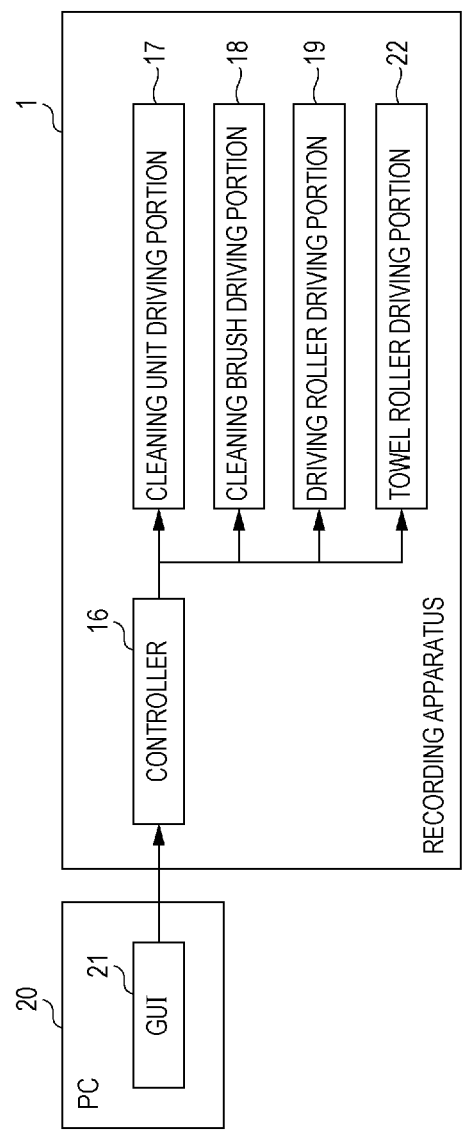

[Fig. 3]
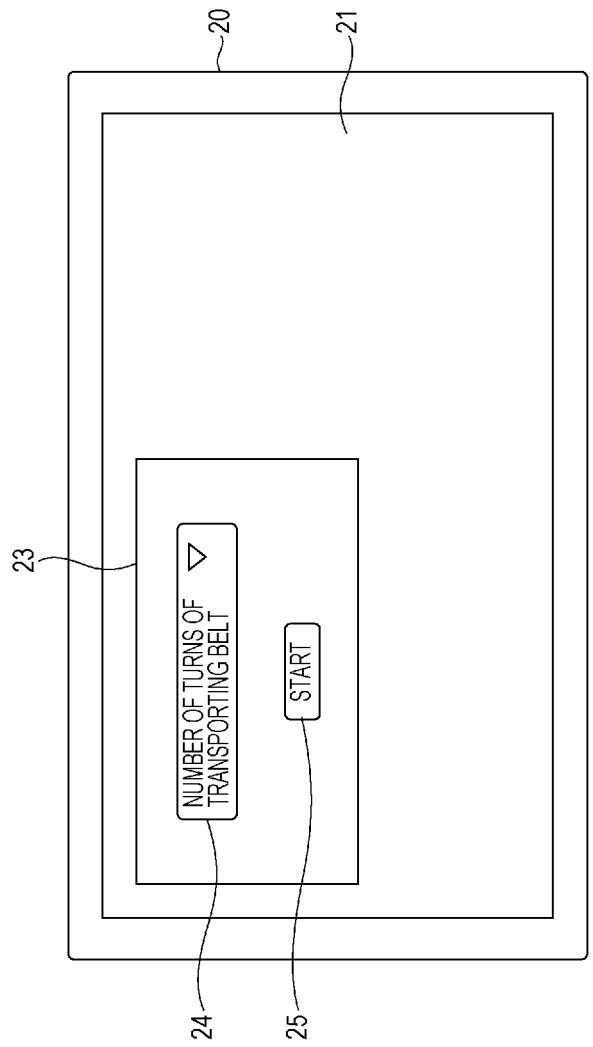
[Fig. 4A]
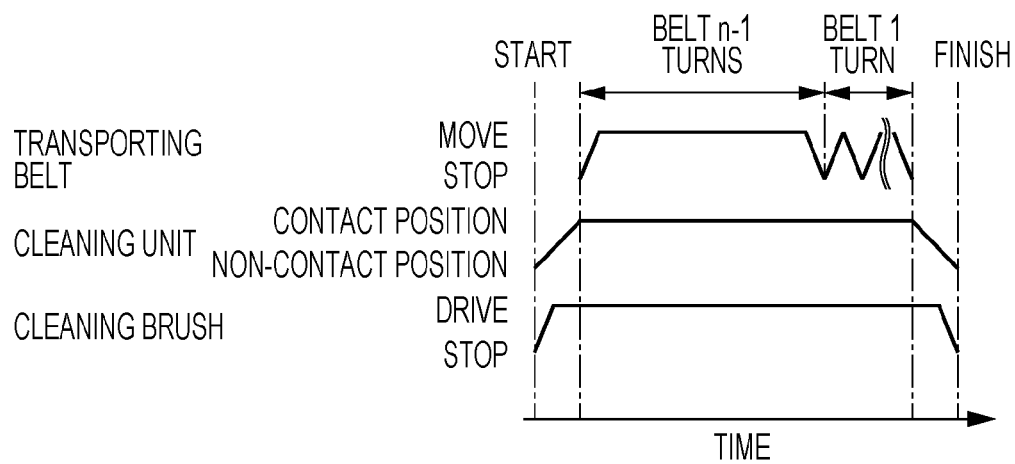

[Fig. 4B]
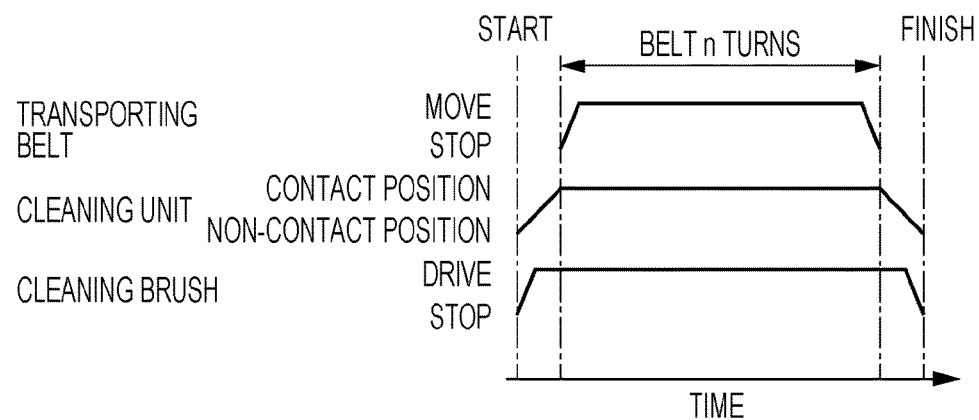

RECORDING APPARATUS AND CLEANING METHOD OF TRANSPORT BELT

TECHNICAL FIELD

The present invention relates to a recording apparatus and a cleaning method of a transport belt which transports a recording medium.

BACKGROUND ART

Hitherto, a recording apparatus including a transport belt which transports a recording medium has been used. Among the recording apparatuses, a recording apparatus capable of cleaning the transport belt has been disclosed.

A recording apparatus capable of cleaning the transport belt using both a wiper and a liquid absorbing material has been disclosed in, for example, PTL 1.

CITATION LIST

Patent Literature

PTL 1: Japanese Unexamined Patent Application Publication No. 3-227648

SUMMARY OF INVENTION

Technical Problem

However, in many cases, cleaning of the transport belt is not sufficiently performed in the recording apparatus of the related art, which includes the transport belt for transporting the recording medium.

Thus, from the result of intensive studies by the inventors, it has been found that insufficient cleaning of the transport belt can be suppressed by providing both a cleaning mode in which the transport belt is cleaned during a recording operation and a cleaning mode in which the transport belt is cleaned during a period other than during the recording operation.

In the description of PTL 1, there is no mention that the recording apparatus has both a mode for cleaning the transport belt during the recording operation and a mode for cleaning the transport belt during a period other than during the recording operation.

An object of the invention is to improve cleaning properties of a transport belt which transports a recording medium.

Solution to Problem

According to a first aspect of the invention for solving the problem described above, there is provided a recording apparatus which includes a transport belt which transports a recording medium, a recording head through which ink is discharged onto the recording medium, and a cleaning portion for the transport belt, in which the recording apparatus has a first cleaning mode in which the cleaning portion cleans the transport belt during transporting of the recording medium by the transport belt and a second cleaning mode in which the cleaning portion cleans the transport belt during a period other that during transporting of the recording medium by the transport belt.

According to the aspect, the recording apparatus has both the first cleaning mode in which the cleaning portion cleans the transport belt during transporting of the recording medium by the transport belt and the second cleaning mode in which the cleaning portion cleans the transport belt during a period other that during transporting of the recording medium by the transport belt. In other words, the transport belt is cleaned, using the first cleaning mode, during a normal recording operation. In addition, a cleaning mode having higher cleaning properties relative to the transport belt than those in the first cleaning mode is set as the second cleaning mode and can be executed as needed. Thus, it is possible to improve cleaning properties relative to the transport belt.

According to the recording apparatus of a second aspect of the invention, in the first aspect, cleaning portion includes a contact portion in which the cleaning portion is in contact with the transport belt and a removing portion which removes a cleaning agent applied to the transport belt. Furthermore, in the second cleaning mode, the transport belt may be cleaned in a state where the transport belt is intermittently moved, and then cleaning of the transport belt is finished.

According to the aspect, the cleaning portion includes the contact portion in which the cleaning portion is in contact with the transport belt and the removing portion which removes a cleaning agent applied to the transport belt. In other words, since the transport belt is cleaned using the cleaning agent, it is possible to improve the cleaning properties relative to the transport belt.

Meanwhile, when the transport belt is cleaned using the cleaning agent, the cleaning agent remains on the transport belt. Thus, in some cases, the recording medium is stained with the cleaning agent. However, according to the aspect, in the second cleaning mode, the transport belt is cleaned in a state where the transport belt is intermittently moved, and then cleaning of the transport belt is finished. Since cleaning is finished in a state where the transport belt is intermittently moved, as described above, it is difficult for the cleaning agent to remain on the transport belt, compared to in a case where cleaning is finished in a state where the transport belt is continuously moved. Thus, staining of the recording medium with the cleaning agent can be suppressed.

Furthermore, the transport belt is cleaned not only in a state where the transport belt is intermittently moved but also in a state where the transport belt is continuously moved prior to cleaning of the transport belt in a state where the transport belt is intermittently moved. As a result, the cleaning time relative to the transport belt is reduced.

According to the recording apparatus of a third aspect of the invention, in the second aspect, a plurality of recording modes in which the recording head performs recording in a state where the transport belt is intermittently moved may be provided. Furthermore, an intermittent movement operation of the transport belt in the second cleaning mode may be an intermittent movement operation of the transport belt in any one of the plurality of recording modes.

According to the aspect, the intermittent movement operation of the transport belt in the second cleaning mode is an intermittent movement operation of the transport belt in any one of the plurality of recording modes. Accordingly, providing the intermittent movement operation of the transport belt, in addition to the plurality of recording modes, can be omitted.

According to the recording apparatus of a fourth aspect of the invention, in the third aspect, the intermittent movement operation of the transport belt in the second cleaning mode is an intermittent movement operation of the transport belt in a recording mode of the plurality of recording modes, in which the amount of the movement of the transport belt per unit time is at the maximum.

According to the aspect, the intermittent movement operation of the transport belt in the second cleaning mode is an intermittent movement operation of the transport belt in a recording mode of the plurality of recording modes, in which the amount of the movement of the transport belt per unit time is at the maximum. Thus, an increase in cleaning time relative to the transport belt can be suppressed.

According to the recording apparatus of a fifth aspect of the invention, in any one of the second aspect to the fourth aspect, the transport belt is an endless belt wound around a plurality of rotation bodies. Furthermore, in the second cleaning mode, the transport belt may be cleaned in a state where the transport belt is intermittently moved by one turn or more, and then cleaning of the transport belt is finished.

In this case, the meaning of "in the second cleaning mode, the transport belt is cleaned in a state where the transport belt is intermittently moved by one turn or more, and then cleaning of the transport belt is finished" includes both a case in which the transport belt is cleaned in a state where the transport belt is continuously moved prior to cleaning of the transport belt in a state where the transport belt is intermittently moved by one turn or more, and a case in which the transport belt is cleaned in a state where the transport belt is not continuously moved and is intermittently moved by one turn or more.

According to the aspect, in the second cleaning mode, the transport belt is cleaned in a state where the transport belt is intermittently moved by one turn or more, and then cleaning of the transport belt is finished. Thus, a remainder of the cleaning agent can be suppressed over the entirety of the transport belt. As a result, staining the recording medium with the cleaning agent can be effectively suppressed.

According to the recording apparatus of a sixth aspect of the invention, in any one of the second aspect to the fifth aspect, the recording apparatus further includes a cloth roller which supports removing of the cleaning agent applied to the transport belt. In addition, in the second cleaning mode, in a case where the transport belt is cleaned in a state where the transport belt is continuously moved, prior to cleaning of the transport belt in a state where the transport belt is intermittently moved, at least when the transport belt is cleaned in a state where the transport belt is continuously moved, the cloth roller may be separated from the transport belt.

In this case, the "cloth roller" means a roller in which cloth is used in a contact portion between the transport belt and the roller.

In a case where the transport belt is cleaned in a state where the transport belt is continuously moved, when the cloth roller is in contact with the transport belt, in some cases, the removal effect of the cloth roller relative to the cleaning agent can deteriorate because the cloth roller is extremely wet with the cleaning agent. However, according to the aspect, in the second cleaning mode, in a case where the transport belt is cleaned in a state where the transport belt is continuously moved, prior to cleaning of the transport belt in a state where the transport belt is intermittently moved, at least when the transport belt is cleaned in a state where the transport belt is continuously moved, the cloth roller is separated from the transport belt. Thus, deterioration in the removal effect relative to the cleaning agent, which results from the extreme wet of the cloth roller with the cleaning agent, can be suppressed.

According to the recording apparatus of a seventh aspect of the invention, in any one of the second aspect to the sixth aspect, in the second cleaning mode, the transport belt is moved by a predetermined distance after cleaning of the transport belt is finished.

When cleaning of the transport belt is finished in the second cleaning mode, in some cases, the cleaning agent remains on a part of the transport belt, which corresponds to a portion between the contact portion and the removing portion in a state where cleaning is finished. However, according to the aspect, in the second cleaning mode, the transport belt is moved by the predetermined distance after cleaning of the transport belt is finished. Thus, even when the cleaning agent remains on the transport belt, a part of the transport belt, on which the cleaning agent remains, can be moved to the position in which a user can easily perform wiping work.

According to the recording apparatus of an eighth aspect of the invention, in the seventh aspect, in the second cleaning mode, the transport belt is moved by a distance equal to or greater than the distance between the contact portion and the removing portion, in a state where the removing portion comes into contact with the transport belt after cleaning of the transport belt is finished.

According to the aspect, in the second cleaning mode, the transport belt is moved by a distance equal to or greater than the distance between the contact portion and the removing portion, in a state where the removing portion comes into contact with the transport belt after cleaning of the transport belt is finished. Accordingly, in a case where cleaning of the transport belt is finished, even when the cleaning agent remains on the part of the transport belt, which corresponds to the portion between the contact portion and the removing portion, the entirety of the portion between the contact portion and the removing portion passes through the removing portion. As a result, it is possible to remove the cleaning agent using the removing portion.

According to a ninth aspect of the invention, there is provided a cleaning method for a transport belt in a recording apparatus including a transport belt that transports a recording medium, a recording head through which ink is discharged onto the recording medium, and a cleaning portion for the transport belt, which includes a first cleaning step of cleaning the transport belt using the cleaning portion during transporting of the recording medium by the transport belt and a second cleaning step of cleaning the transport belt using the cleaning portion during a period other that during transporting of the recording medium by the transport belt.

According to the aspect, the cleaning method includes both a first cleaning step in which the cleaning portion cleans the transport belt during transporting of the recording medium by the transport belt and a second cleaning step in which the cleaning portion cleans the transport belt during a period other than during transporting of the recording medium by the transport belt. In other words, the transport belt is cleaned, in the first cleaning step, during the normal recording operation. In addition, a cleaning step having higher cleaning properties relative to the transport belt than those in the first cleaning step is set to the second cleaning step and can be executed as needed. Thus, it is possible to improve the cleaning properties relative to the transport belt.

BRIEF DESCRIPTION OF DRAWINGS

FIG. 1 is a schematic side view illustrating a recording apparatus according to an example of the invention.

FIG. 2 is a block diagram illustrating a control configuration of a principal portion of a recording apparatus according to the example of the invention.

FIG. 3 is a view illustrating a display screen of a GUI through which setting at the time of executing a cleaning sequence for the transport belt according to the example of the invention is performed.

FIG. 4A is a graph illustrating the cleaning sequence for the transport belt according to the example of the invention.

FIG. 4B is a graph illustrating the cleaning sequence for the transport belt according to the example of the invention.

DESCRIPTION OF EMBODIMENT

Hereinafter, the details of a recording apparatus according to an embodiment of the invention will be described with reference to the accompanying drawings.

FIG. 1 is a schematic side view illustrating a recording apparatus 1 according to an example of the invention.

The recording apparatus 1 of the example includes a transport belt 2 which is wound around a driving roller 3 and a driven roller 4, supports a recording medium P, and transports the recording medium P in a transporting direction A. The driving roller 3 and the driven roller 4 rotate in a rotating direction C. The recording apparatus 1 of the example includes two rollers as a plurality of rotation bodies, which are the driving roller 3 and the driven roller 4. However, the recording apparatus 1 of the example may include three or more rollers. Furthermore, among three or more rollers, a plurality of rollers may be driving rollers.

The transport belt 2 of the example moves in a direction D in accordance with the rotation of the driving roller 3 in the rotating direction C, and thus the transport belt 2 transports the recording medium P in the transporting direction A.

The transport belt 2 of the example is an adhesive belt in which adhesive is applied to a surface supporting the recording medium P. The adhesive separably holds the recording medium P in an adhesive manner. However, the transport belt 2 is not limited to such an adhesive belt and may be a transport belt which holds the recording medium P in an electrostatic attracting manner.

Furthermore, a recording head 6 is provided in a transporting path of the recording medium P by the transport belt 2. The recording apparatus 1 forms a desired image in such a manner that the recording apparatus 1 causes the recording head 6 to reciprocate, through a carriage 5, in a direction B perpendicular to the transporting direction A and the recording apparatus 1 causes the recording head 6 to discharge ink onto the recording medium from an ink discharge surface F.

The recording apparatus 1 of the example includes the recording head 6 which performs recording in a state where the recording head 6 reciprocates. However, the recording apparatus 1 of the example may be a recording apparatus including a so-called line head in which a plurality of nozzles through which ink is discharged is arranged in a direction perpendicular to the transporting direction A.

Here, the "line head" means a recording head in which a nozzle area formed in the direction B perpendicular to the transporting direction A of the recording medium P can cover the entirety of the recording medium P in the direction B and which is used for a recording apparatus in which an image is formed in such a manner that one of the recording head and the recording medium P is fixed and the other moves. The nozzle area of the line head in the direction B may not cover the entirety of all types of the recording mediums P in the direction B, which are used in the recording apparatus.

In the recording apparatus 1 of the example, the recording medium P is separated from the transport belt 2 in a predetermined range, and then the recording medium P is wound, through a driven roller 7 fixed in a predetermined position, by a winding portion 8. When the winding portion 8 winds the recording medium P, the winding portion 8 causes the recording medium P to rotate in the rotating direction C.

In a transporting path of the recording medium P, a sensor 9 which detects a separation position of the recording medium P from the transport belt 2 is provided in a portion between a position in which the recording medium P is separated from the transport belt 2 and a position in which the driven roller 7 is provided.

In this case, the sensor 9 is an optical sensor which detects the separation of the recording medium P from the transport belt 2 in such a manner that a light beam is emitted from a direction perpendicular to a surface of the recording medium P and the light beam reflected from the surface of the recording medium P is received.

Thus, the detection accuracy of the example is higher than that of the method of the related art, in which the separation of the recording medium P from the transport belt 2 is detected in such a manner that the light beam is emitted from a direction along the surface of the recording medium P and blocking of the reflected light beam by the recording medium P is detected, using an optical sensor having a configuration in which a reflection portion is provided on a side facing an emission portion, and the light beam reflected from the reflection portion is received. The reason for this is as follows. In such a method of the related art, the detection time by the optical sensor is deviated from the time at which the reflected light beam is blocked by the recording medium P because the length (thickness) in a direction perpendicular to the surface of the recording medium P is short. Thus, a detection error occurs.

The recording apparatus 1 of the example includes a cleaning unit 10 as a cleaning portion for cleaning the transport belt 2. The cleaning unit 10 includes a cleaning brush 11 and wipers 13a and 13b. The cleaning brush 11 is a portion in contact with both a cleaning agent 14 in a cleaning agent tank 12 and a transport belt 2. The wipers 13a and 13b are portions removing the cleaning agent 14 which is applied to the transport belt 2 in accordance with contact of the cleaning brush 11 with the transport belt 2.

The cleaning agent 14 of the example is water. However, without being limited to water, the cleaning agent 14 of the example may be a cleaning agent containing detergent components, such as surface-active agents. The cleaning agent adhering to the transport belt also includes liquid in a state where the ink which is discharged through the recording head 6 and applied to the transport belt 2 is mixed with the cleaning agent 14 by the cleaning brush 11.

In this case, the cleaning brush 11 can be moved in a direction E by a cleaning unit driving portion 17 (see FIG. 2). Thus, the recording apparatus 1 of the example can cause the cleaning brush 11 to move from a position in which the cleaning brush 11 is in contact with the transport belt 2 to a position in which the cleaning brush 11 is not in contact with the transport belt 2.

Furthermore, the recording apparatus 1 of the example can cause the cleaning brush 11 and the transport belt 2 to be in contact/non-contact with each other not only in a state where the cleaning brush 11 rotates in the rotating direction C but also in a state where the rotational driving of the cleaning brush 11 is stopped.

When the cleaning brush 11 comes into contact with the transport belt 2 in a state where the cleaning brush 11 rotates in the rotating direction C, it is easy for the cleaning agent 14 to move from the cleaning agent tank 12 to the transport belt 2 through the cleaning brush 11. In contrast, when the cleaning brush 11 comes into contact with the transport belt 2 in a state where the rotational driving of the cleaning brush 11 is stopped, it is difficult for the cleaning agent 14 to move from the cleaning agent tank 12 to the transport belt 2.

The recording apparatus 1 of the example includes a towel roller 15 as a cloth roller for supporting removing of the cleaning agent 14 applied to the transport belt 2. The towel roller 15 is located in a position facing the driven roller 4 interposing the transport belt 2 therebetween.

In this case, the "cloth roller" means a roller in which cloth is used in a contact portion between the transport belt 2 and the roller.

The towel roller 15 can be rotationally driven in a direction opposite to the rotating direction C. In addition, the towel roller 15 can be moved in a direction G by a towel roller driving portion 22 (see FIG. 2). Thus, the recording apparatus 1 of the example can cause the towel roller 15 to move from a position in which the towel roller 15 is in contact with the transport belt 2 to a position in which the towel roller 15 is not in contact with the transport belt 2.

The towel roller 15 of the example has a configuration in which the towel roller 15 can be rotationally driven in the direction opposite to the rotating direction C in accordance with the movement of the transport belt 2 in the direction D. However, without being limited to such a configuration, the towel roller 15 of the example may have, for example, a configuration in which the towel roller 15 is rotationally driven in the rotating direction C.

Next, a control configuration of a principal portion of the recording apparatus 1 of the example will be described.

FIG. 2 is a block diagram illustrating a control configuration of a principal portion of the recording apparatus 1 according to the example.

The recording apparatus 1 of the example includes a controller 16 including CPU, ROM and RAM. The CPU manages control of the entirety of the recording apparatus 1. Sequence data of various cleaning modes, various recording modes, and the like, various control programs, and the like are stored in the ROM. Data can be temporarily stored in the RAM.

The controller 16 is connected to a PC 20 including a Graphical User Interface (GUI) 21 through which instruction of a user can be input. The controller 16 is connected to the cleaning unit driving portion 17, a cleaning brush driving portion 18, a driving roller driving portion 19, and the towel roller driving portion 22. The cleaning unit driving portion 17 causes the cleaning brush 11 to move in the direction E. The cleaning brush driving portion 18 causes the cleaning brush 11 to be rotationally driven in the rotating direction C. The driving roller driving portion 19 causes the driving roller 3 to be rotationally driven in the rotating direction C. The towel roller driving portion 22 causes the towel roller 15 to move in a direction G.

In other words, the controller 16 controls, in accordance with the instruction of a user input through the PC 20, the cleaning brush 11, the driving roller 3, and the towel roller 15, via the cleaning unit driving portion 17, the cleaning brush driving portion 18, the driving roller driving portion 19, and the towel roller driving portion 22.

Next, a cleaning sequence of the transport belt 2 executed by the recording apparatus 1 of the example will be described.

The recording apparatus 1 of the example has a first cleaning mode and a second cleaning mode. In the first cleaning mode, the transport belt 2 is cleaned by the cleaning unit 10 during a recording operation by the recording head 6, in other words, during a period in which transporting of the recording medium P is performed by the transport belt. In the second cleaning mode, the transport belt 2 is cleaned by the cleaning unit 10 in a state other than that of the recording operation by the recording head 6, in other words, in a state where transporting of the recording medium P is not performed by the transport belt.

Incidentally, in the recording apparatus 1 of the example, the first cleaning mode is a cleaning mode automatically performed in the recording operation and the second cleaning mode is a cleaning mode as a so-called maintenance mode performed by the execution instruction of a user. However, the recording apparatus 1 of the example has a configuration in which the recording apparatus 1 can prevent the first cleaning mode from being executed in the recording operation.

Both the first cleaning mode and the second cleaning mode are a cleaning mode in which the transport belt 2 is cleaned in such a manner that the transport belt 2 moves in the direction D and the cleaning brush 11 is rotationally driven in the rotating direction C in a state where the cleaning brush 11 comes into contact with the transport belt 2.

The recording apparatus 1 of the example includes the transport belt 2 for transporting the recording medium P, the recording head 6 through which the ink is discharged onto the recording medium P, and the cleaning unit 10 for the transport belt 2, as described above. Furthermore, the recording apparatus 1 of the example includes both the first cleaning mode in which the transport belt 2 is cleaned by the cleaning unit 10 during the recording operation by the recording head 6, that is, during a period in which transporting of the recording medium P is performed by the transport belt 2 and the second cleaning mode in which the transport belt is cleaned, by the cleaning unit 10, in a state except for the recording operation by the recording head 6, that is, in a state where transporting of the recording medium P is not performed by the transport belt 2.

Since the recording apparatus 1 of the example has the configuration described above, the recording apparatus 1 can clean the transport belt 2, using the first cleaning mode, during the normal recording operation. In addition, in the recording apparatus 1, a cleaning mode having higher cleaning properties relative to the transport belt 2 than those in the first cleaning mode is set as the second cleaning mode and can be executed as needed. As a result, it is possible to improve cleaning properties relative to the transport belt 2.

When describing using another expression from the point of view of the cleaning method for the transport belt 2 of the recording apparatus 1 of the example, the cleaning method of the example is a cleaning method for the transport belt 2 in the recording apparatus 1 which includes the transport belt 2 for supporting and transporting the recording medium P, the recording head 6 through which ink is discharged onto the recording medium P, and the cleaning unit 10 for the transport belt 2. Furthermore, the cleaning method of the example has both a first cleaning step and a second cleaning step. In the first cleaning step, the transport belt 2 is cleaned by the cleaning unit 10 during the recording operation by the recording head 6. In the second cleaning step, the transport belt 2 is cleaned by the cleaning unit 10 during a period except for the recording operation by the recording head 6.

In other words, in the cleaning method of the example, the transport belt 2 is cleaned, in the first cleaning step, during the normal recording operation. In addition, a cleaning step having higher cleaning properties relative to the transport belt 2 than those in the first cleaning step is set as the second cleaning step and can be executed as needed. As a result, it is possible to improve cleaning properties relative to the transport belt 2.

The recording apparatus 1 of the example can set the number of turns of the transport belt 2 in the second cleaning mode.

FIG. 3 is a view illustrating a display screen of the GUI 21 through which setting at the time of executing a cleaning sequence for the transport belt 2 is performed in the recording apparatus 1 of the example.

A user can set the number of turns n of the transport belt 2 in the second cleaning mode, using a pull-down tab 24 of the window 23 which is displayed on the GUI 21 of the PC 20. A user can cause the second cleaning mode to be executed in the recording apparatus 1 by pressing a start tab 25 after a user sets the number of turns n of the transport belt 2 in the second cleaning mode, using the pull-down tab 24. In this case, n is a natural number.

In this case, the second cleaning mode in the recording apparatus 1 of the example is a cleaning mode in which, during the last one turn of the transport belt 2, the transport belt 2 is cleaned in a state where the transport belt 2 is intermittently moved, and then cleaning of the transport belt 2 is finished.

Hereinafter, the second cleaning mode will be described in more detail, using FIGS. 4A and 4B.

FIG. 4A is a graph illustrating the cleaning sequences of the transport belt 2, which is executed, in the second cleaning mode, by the recording apparatus 1 of the example.

Horizontal axes in FIGS. 4A and 4B indicate the elapsed time. FIGS. 4A and 4B illustrate moving/stopping of the transport belt at each time, the position of the cleaning brush 11 of the cleaning unit 10, relative to the transport belt, and driving/stopping of the cleaning brush 11.

When a user presses the start tab 25 after a user sets, using the pull-down tab 24, the number of turns n of the transport belt 2 in the second cleaning mode, and thus the execution of the second cleaning mode is started, the cleaning brush 11 in a stopped state starts to be driven and the cleaning brush 11 moves from a position in which the cleaning brush 11 is not in contact with the transport belt 2 to a position in which the cleaning brush 11 is in contact with the transport belt 2, as illustrated in FIG. 4A. When describing using another expression, the cleaning unit 10 is moved from a non-contact position to a contact position.

When the cleaning unit 10 is moved from the non-contact position to the contact position, the transport belt 2 continuously moves (that is, performs a continuous movement), by n−1 turns, in a state where the cleaning brush 11 is in contact with the transport belt 2 and the cleaning brush 11 is driven in the rotating direction C.

Although simply illustrated in FIG. 4A, the transport belt 2 is continuously moved by n−1 turns, and then the transport belt 2 is intermittently moved (performs intermittent movement) several times in the last one turn so as to repeatedly perform driving/stopping. In the recording apparatus 1 of the example, the maximum movement speed of the transport belt 2 in the intermittent movement is 200 mm/s, the movement distance of the transport belt 2 in one intermittent movement is 12.7 mm, and the stopped period of the transport belt 2 in the intermittent movement is 200 ms.

The transport belt 2 is intermittently moved by the last one turn, and then the cleaning unit 10 is moved from the contact position to the non-contact position and the rotational driving of the cleaning brush 11 is stopped. As a result, the second cleaning mode is finished.

When a user sets one turn as the number of turns n of the transport belt 2, the transport belt 2 is not continuously moved and is intermittently moved in the one turn.

Meanwhile, FIG. 4B is a graph illustrating the cleaning sequences for the transport belt 2 in a case, which is an example different from the example, where the transport belt 2 is cleaned in such a manner that the transport belt 2 is continuously moved by the entirety of n turns.

In this case, when the transport belt 2 is cleaned in a state where the transport belt 2 is intermittently moved, it is difficult for the cleaning agent 14 to remain on the transport belt 2, compared to in a case where the transport belt 2 is cleaned in a state where the transport belt 2 is continuously moved.

Thus, upon comparison with a recording apparatus in which the cleaning sequence illustrated in FIG. 4B is performed, staining the recording medium P with the cleaning agent 14 is suppressed in the recording apparatus 1 of the example in which the cleaning sequence illustrated in FIG. 4A is performed.

In the recording apparatus 1 of the example, the cleaning unit 10 includes the cleaning brush 11 and the wipers 13a and 13b, as described above. The cleaning brush 11 comes into contact with the transport belt in a state where the cleaning agent 14 is applied to the cleaning brush 11. The wipers 13a and 13b remove the cleaning agent 14 applied to the transport belt 2. In the second cleaning mode, the transport belt 2 is cleaned in a state where the transport belt 2 is intermittently moved, and then cleaning of the transport belt 2 is finished.

In the recording apparatus 1 of the example, the cleaning properties relative to the transport belt 2 are improved in such a manner that the transport belt 2 is cleaned by applying the cleaning agent 14.

Meanwhile, when the transport belt 2 is cleaned by applying the cleaning agent 14 thereto, the cleaning agent 14 remains on the transport belt 2. Thus, in some cases, the recording medium P is stained with the cleaning agent 14. However, in the second cleaning mode of the recording apparatus 1 of the example, the transport belt 2 is cleaned in a state where the transport belt 2 is intermittently moved, and then cleaning of the transport belt 2 is finished. Since cleaning is finished in a state where the transport belt 2 is intermittently moved, as described above, it is difficult for the cleaning agent 14 to remain on the transport belt, compared to in a case where cleaning is finished in a state where the transport belt 2 is continuously moved. Thus, staining of the recording medium P with the cleaning agent 14 is suppressed.

In the second cleaning mode, the transport belt 2 is cleaned not only in a state where the transport belt 2 is intermittently moved but also in a state where the transport belt 2 is continuously moved prior to cleaning of the transport belt 2 in a state where the transport belt 2 is intermittently moved. As a result, the cleaning time relative to the transport belt 2 is reduced, compared to the cleaning mode in which cleaning is performed only in a state where the transport belt 2 is intermittently moved.

In this case, the recording apparatus 1 of the example has a plurality of recording modes in which the recording head 6 performs recording in a state where the transport belt 2 is intermittently moved. Recording on a recording medium is performed using any one of the recording modes, in accordance with the quality of an image to be recorded and the recording speed.

In the recording apparatus 1 of the example, the intermittent movement operation of the transport belt 2 in the second cleaning mode is an intermittent movement operation of the transport belt 2 in a recording mode, out of the plurality of recording modes, in which the amount of the movement of the transport belt 2 per unit time is at the maximum.

Thus, providing the intermittent movement operation of the transport belt 2, in addition to the plurality of recording modes, is omitted and an increase in cleaning time relative to the transport belt 2 is suppressed.

In the recording apparatus 1 of the example, the intermittent movement operation of the transport belt 2 in the second cleaning mode is performed in a recording mode, out of the plurality of recording modes, in which the amount of the movement of the transport belt 2 per unit time is at the maximum, as described above.

However, in a case where the intermittent movement operation of the transport belt 2 in the second cleaning mode is an intermittent movement operation of the transport belt 2 in any one of the plurality of recording modes, there is an advantage that, even when the amount of the movement of the transport belt 2 per unit time is not at the maximum, providing the intermittent movement operation of the transport belt 2, in addition to the plurality of recording modes, can be omitted.

In the recording apparatus 1 of the example, the transport belt 2 is an endless belt wound around a plurality of rotation bodies (the driving roller 3 and the driven roller 4), as described above.

In the second cleaning mode, the transport belt 2 is cleaned in a state where the transport belt 2 is intermittently moved by one turn, and then cleaning of the transport belt 2 is finished.

It is preferable that the second cleaning mode be a mode in which the transport belt 2 is cleaned in a state where the transport belt 2 is intermittently moved by one turn or more, and then cleaning of the transport belt 2 is finished, as described above.

In this case, the meaning of "in the second cleaning mode, the transport belt 2 is cleaned in a state where the transport belt 2 is intermittently moved by one turn or more, and then cleaning of the transport belt 2 is finished" includes both a case, such as the example in which the transport belt 2 is cleaned in a state where the transport belt 2 is continuously moved prior to cleaning of the transport belt 2 in a state where the transport belt 2 is intermittently moved by one turn or more, and a case in which the transport belt 2 is cleaned in a state where the transport belt 2 is not continuously moved and is intermittently moved by one turn or more.

In the second cleaning mode, the transport belt 2 is cleaned in a state where the transport belt 2 is intermittently moved by one turn or more, and then cleaning of the transport belt 2 is finished. Thus, a remainder of the cleaning agent 14 can be suppressed over the entirety of the transport belt 2. As a result, staining the recording medium P with the cleaning agent 14 can be effectively suppressed.

The recording apparatus 1 of the example includes the towel roller 15 which supports removing of the cleaning agent 14 applied to the transport belt 2, as described above.

In this case, in the second cleaning mode of the recording apparatus 1 of the example, in a case where the transport belt 2 is cleaned in a state where the transport belt 2 is continuously moved, prior to cleaning of the transport belt 2 in a state where the transport belt 2 is intermittently moved, at least when the transport belt 2 is cleaned in a state where the transport belt 2 is continuously moved, the towel roller 15 is separated from the transport belt 2.

In a case where the transport belt 2 is cleaned in a state where the transport belt 2 is continuously moved, when the towel roller 15 is in contact with the transport belt 2, in some cases, the removal effect of the towel roller 15 relative to the cleaning agent 14 deteriorates because the towel roller 15 is extremely wet with the cleaning agent 14. However, deterioration in the removal effect relative to the cleaning agent 14, which results from the extreme wet of the towel roller 15 with the cleaning agent 14, is suppressed in the recording apparatus 1 of the example.

The recording apparatus 1 of the example causes the transport belt 2 to move, in accordance with the control of the controller 16, by a predetermined distance after the cleaning of the transport belt 2 is finished in the second cleaning mode.

In this case, the predetermined distance in the example is a distance in which a part of the transport belt 2, which corresponds to a portion between the cleaning brush 11 and the wiper 13a as a removing portion on a front side in a state where cleaning of the transport belt 2 is finished in the second cleaning mode, reaches a position in which the part of the transport belt 2 is directed upward.

When cleaning of the transport belt 2 is finished in the second cleaning mode, in some cases, the cleaning agent 14 remains on the part of the transport belt 2, which corresponds to the portion between the cleaning brush 11 and the wiper 13a in a state where cleaning is finished. However, in the second cleaning mode, the recording apparatus 1 of the example causes the transport belt 2 to move by the predetermined distance after cleaning of the transport belt 2 is finished. Thus, even when the cleaning agent 14 remains on the part of the transport belt 2, which corresponds to the portion between the cleaning brush 11 and the wiper 13a, the transport belt 2 is moved to the position in which the part of the transport belt 2 is directed upward. As a result, a user can wipe the cleaning agent 14, in a position where a user can easily perform wiping work.

In the recording apparatus 1 of the example, the predetermined distance is a distance in which the part of the transport belt 2, which corresponds to the portion between the cleaning brush 11 and the wiper 13a in a state where cleaning of the transport belt 2 is finished in the second cleaning mode, reaches a position where the part of the transport belt 2 is directed upward. However, when the transport belt 2 is moved by a predetermined distance in a state where the wipers 13a and 13b come into contact with the transport belt 2, the predetermined distance can be set to a distance equal to or greater than a distance L between the cleaning brush 11 and the wiper 13a as a removing portion on the front side, as illustrated in FIG. 1.

Accordingly, in a case where cleaning of the transport belt 2 is finished in the second cleaning mode, even when the cleaning agent 14 remains on the part of the transport belt 2, which corresponds to the portion between the cleaning brush 11 and the wiper 13a, the entirety of the portion between the cleaning brush 11 and the wiper 13a passes through the wiper 13a. As a result, there is an advantage that the wiper 13a can remove the cleaning agent 14.

In the recording apparatus 1 of the example, when the transport belt 2 is moved by the predetermined distance, the transport belt 2 is moved in a state where the cleaning brush 11 in a stopped state is in contact with the transport belt 2. When the cleaning brush 11 is stopped, it is difficult for the cleaning agent 14 to move from the cleaning brush 11 to the transport belt 2 and, furthermore, the cleaning agent 14 can move from the transport belt 2 to the cleaning brush 11. Thus, there is an advantage that the effect of removing the cleaning agent 14 from the transport belt 2 increases.

In the recording apparatus 1 of the example described above, cleaning of the transport belt 2 is performed in such a manner that the cleaning brush 11 applies the cleaning agent 14 to the transport belt 2. However, without being limited thereto, the transport belt 2 may be cleaned by the cleaning brush 11, in a state where the cleaning agent 14 is sprayed to the transport belt 2 through, for example nozzles.

The entire disclosure of Japanese Patent Application No. 2013-208809, filed Oct. 4, 2013 is expressly incorporated by reference herein.

REFERENCE SIGNS LIST 1 recording apparatus
2 transport belt
3 driving roller
4 driven roller
5 carriage
6 recording head
7 driven roller
8 winding portion
9 sensor
10 cleaning unit (cleaning portion)
11 cleaning brush (contact portion)
12 cleaning agent tank
13a, 13b wiper
14 cleaning agent
15 towel roller (cloth roller)
16 controller
17 cleaning unit driving portion
18 cleaning brush driving portion
19 driving roller driving portion
20 PC
21 GUI
22 towel roller driving portion
23 window
24 pull-down tab
25 start tab
L distance between cleaning brush 11 and wiper 13a which is a removing portion on a front side
P recording medium

The invention claimed is:

1. A recording apparatus comprising:
a transport belt which transports a recording medium;
a recording head through which ink is discharged onto the recording medium;
a cleaning portion for the transport belt; and
a controller configured to operate the recording apparatus in a first cleaning mode and a second cleaning mode, wherein:
in the first cleaning mode, the cleaning portion cleans the transport belt during transporting of the recording medium by the transport belt, and
in the second cleaning mode, the cleaning portion cleans the transport belt during a period when a recording operation is not being performed by the recording head, and movement of the transport belt includes both continuous movement and intermittent movement,
wherein the cleaning portion includes a contact portion in which the cleaning portion is in contact with the transport belt and a removing portion which removes a cleaning agent applied to the transport belt, and
wherein, in the second cleaning mode, the transport belt is cleaned in a state where the transport belt is continuously moved first, then intermittently moved, and then cleaning of the transport belt is finished.

2. The recording apparatus according to claim 1, wherein a plurality of recording modes in which the recording head performs recording in a state where the transport belt is intermittently moved are provided, and wherein an intermittent movement operation of the transport belt in the second cleaning mode is an intermittent movement operation of the transport belt in any one of the plurality of recording modes.

3. The recording apparatus according to claim 2, wherein the intermittent movement operation of the transport belt in the second cleaning mode is an intermittent movement operation of the transport belt in a recording mode of the plurality of recording modes, in which the amount of the movement of the transport belt per unit time is at the maximum.

4. The recording apparatus according to claim 1, wherein the transport belt is an endless belt wound around a plurality of rotation bodies, and
wherein, in the second cleaning mode, the transport belt is cleaned in a state where the transport belt is intermittently moved by one turn or more, and then cleaning of the transport belt is finished.

5. The recording apparatus according to claim 1, further comprising:
a cloth roller which supports removing of the cleaning agent applied to the transport belt when the cloth roller is in contact with the transport belt,
wherein, in the second cleaning mode, the cloth roller is configured not to be in contact with the transport belt when the transport belt moves continuously, and to be in contact with the transport belt when the transport belt moves intermittently.

6. The recording apparatus according to claim 1, wherein, in the second cleaning mode, the transport belt is moved by a predetermined distance after cleaning of the transport belt is finished, such that the portion of the transport belt that may contain residual cleaning agent is moved to a position accessible to a user for additional cleaning.

7. The recording apparatus according to claim 6, wherein, the predetermined distance is a distance equal to or greater than the distance between the contact portion and the removing portion.

* * * * *